(12) United States Patent  
Schubert

(10) Patent No.: US 9,341,539 B2  
(45) Date of Patent: May 17, 2016

(54) CARGO CONTAINER SYSTEM WITH SELECTIVELY DEPLOYABLE SUPPORT AND WHEEL ASSEMBLIES

(76) Inventor: Eric Raymond Schubert, New Boston, MI (US)

( * ) Notice: Subject to any disclaimer, the term of this patent is extended or adjusted under 35 U.S.C. 154(b) by 145 days.

(21) Appl. No.: 13/284,902

(22) Filed: Oct. 29, 2011

(65) Prior Publication Data

US 2012/0242060 A1    Sep. 27, 2012

Related U.S. Application Data

(63) Continuation-in-part of application No. 12/368,204, filed on Feb. 9, 2009, now Pat. No. 8,282,110.

(60) Provisional application No. 61/408,466, filed on Oct. 29, 2010, provisional application No. 61/408,479, filed on Oct. 29, 2010, provisional application No. 61/135,717, filed on Jul. 23, 2008.

(51) Int. Cl.
*B60P 3/06* (2006.01)
*G01M 3/32* (2006.01)
*B61D 3/18* (2006.01)
*B61D 45/00* (2006.01)

(52) U.S. Cl.
CPC .................. *G01M 3/32* (2013.01); *B61D 3/184* (2013.01); *B61D 45/004* (2013.01)

(58) Field of Classification Search
CPC ........ B61D 45/004; B61D 3/184; B60P 7/00; B60P 7/13; G01M 3/32; B62B 3/14; B62B 3/16
USPC ............. 280/86.5, 33.998, 33.991, 43, 43.27, 280/47, 423.1, 476.1, 763.1, 438.1; 410/56, 410/57, 65, 66, 68; 180/21, 24.02, 209

See application file for complete search history.

(56) References Cited

U.S. PATENT DOCUMENTS

| | | | | |
|---|---|---|---|---|
| 3,203,711 | A * | 8/1965 | Chew | 280/418.1 |
| 3,286,654 | A * | 11/1966 | Fisher | 105/177 |
| 5,035,439 | A * | 7/1991 | Petrillo | 280/81.6 |
| 5,332,258 | A * | 7/1994 | Buttner | 280/86.5 |
| 6,398,236 | B1 * | 6/2002 | Richardson | 280/86.5 |
| 6,726,438 | B2 * | 4/2004 | Chernoff et al. | 414/802 |
| 6,729,817 | B1 * | 5/2004 | Fennell | 410/56 |
| 6,883,813 | B2 * | 4/2005 | Gottschalk | 280/86.5 |
| 7,677,339 | B2 * | 3/2010 | Oscarsson | 180/24.02 |
| 8,282,110 | B2 * | 10/2012 | Schubert | 280/43 |

* cited by examiner

*Primary Examiner* — James English
(74) *Attorney, Agent, or Firm* — Preston Smirman; Smirman IP Law, PLLC

(57) ABSTRACT

A cargo container system is provided having selectively deployable and retractable support and/or wheel assemblies. The wheel assemblies are capable of being retracted upwardly while the landing assembly is capable of being deployed downwardly and/or retracted upwardly, e.g., during storage or shipment of the cargo container system (e.g., during sea travel or rail travel). At an appropriate time (e.g., the cargo container system is about to placed onto the ground or other surface by a crane or other suitable device), the wheel assemblies are then selectively deployed downwardly while the landing gear assembly is capable of being retracted upwardly and/or deployed downwardly, e.g., to provide a fully functional cargo container system/trailer/chassis combination that may be immediately capable of being engaged to a truck/tractor/chassis and driven away.

17 Claims, 6 Drawing Sheets

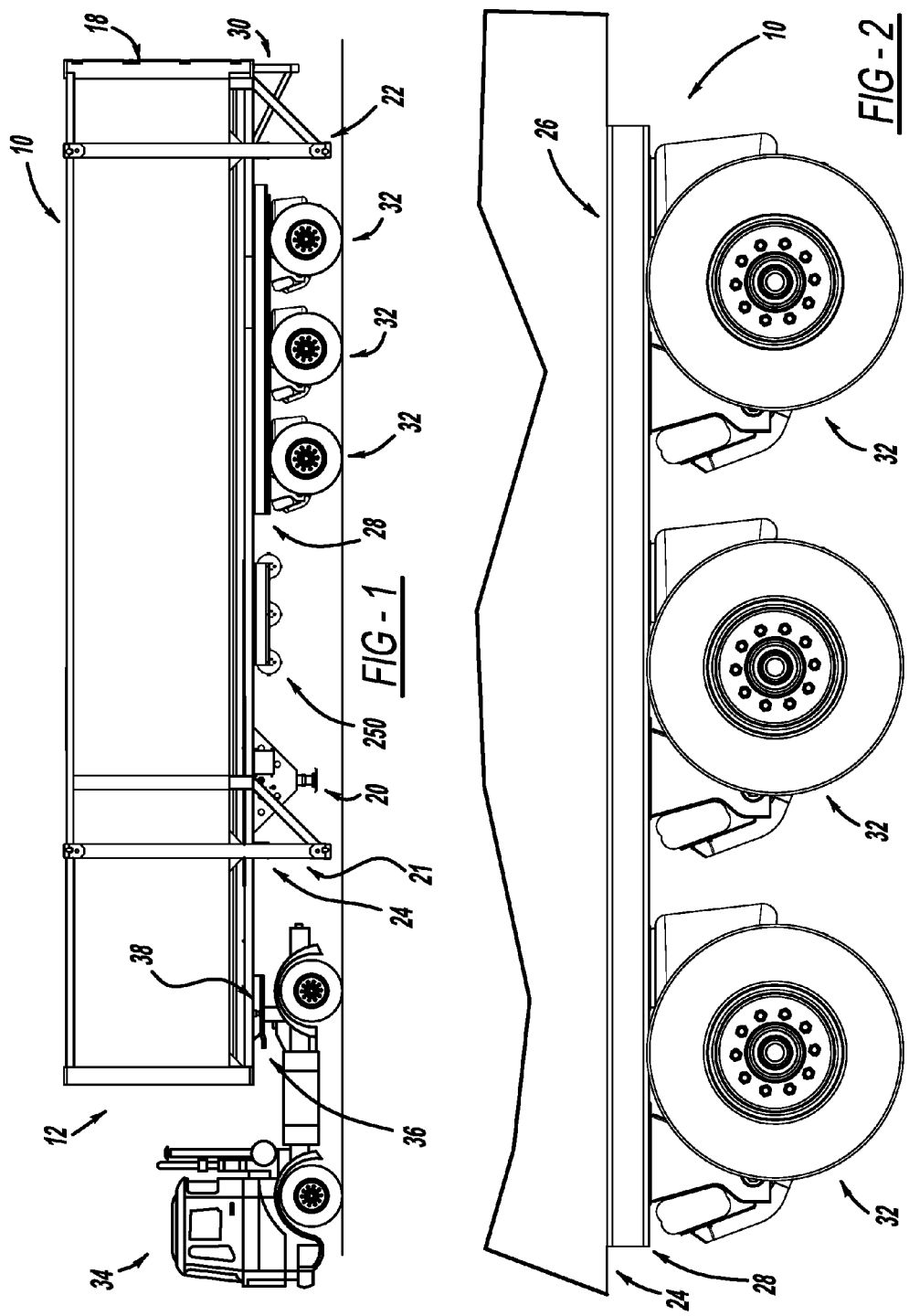

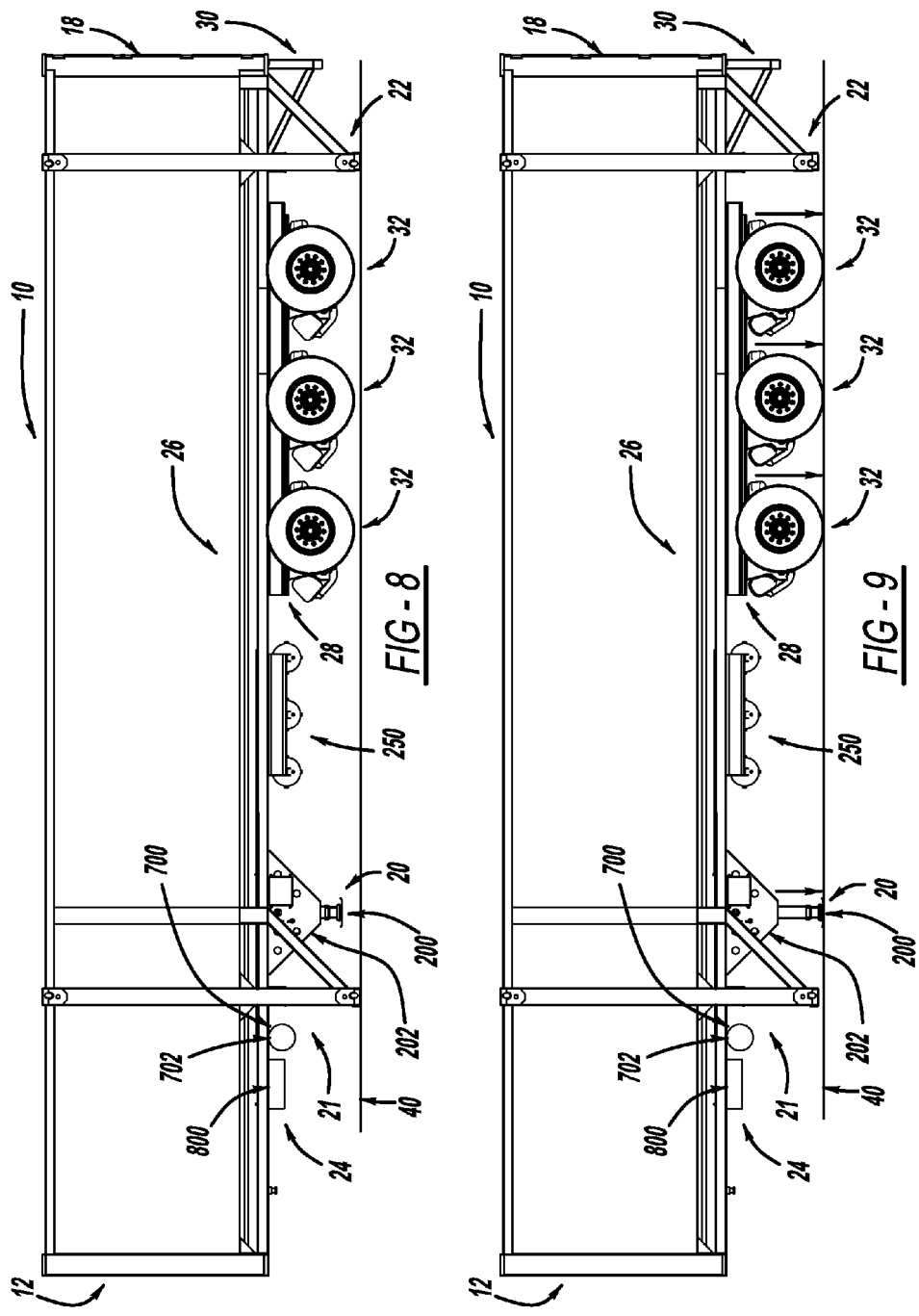

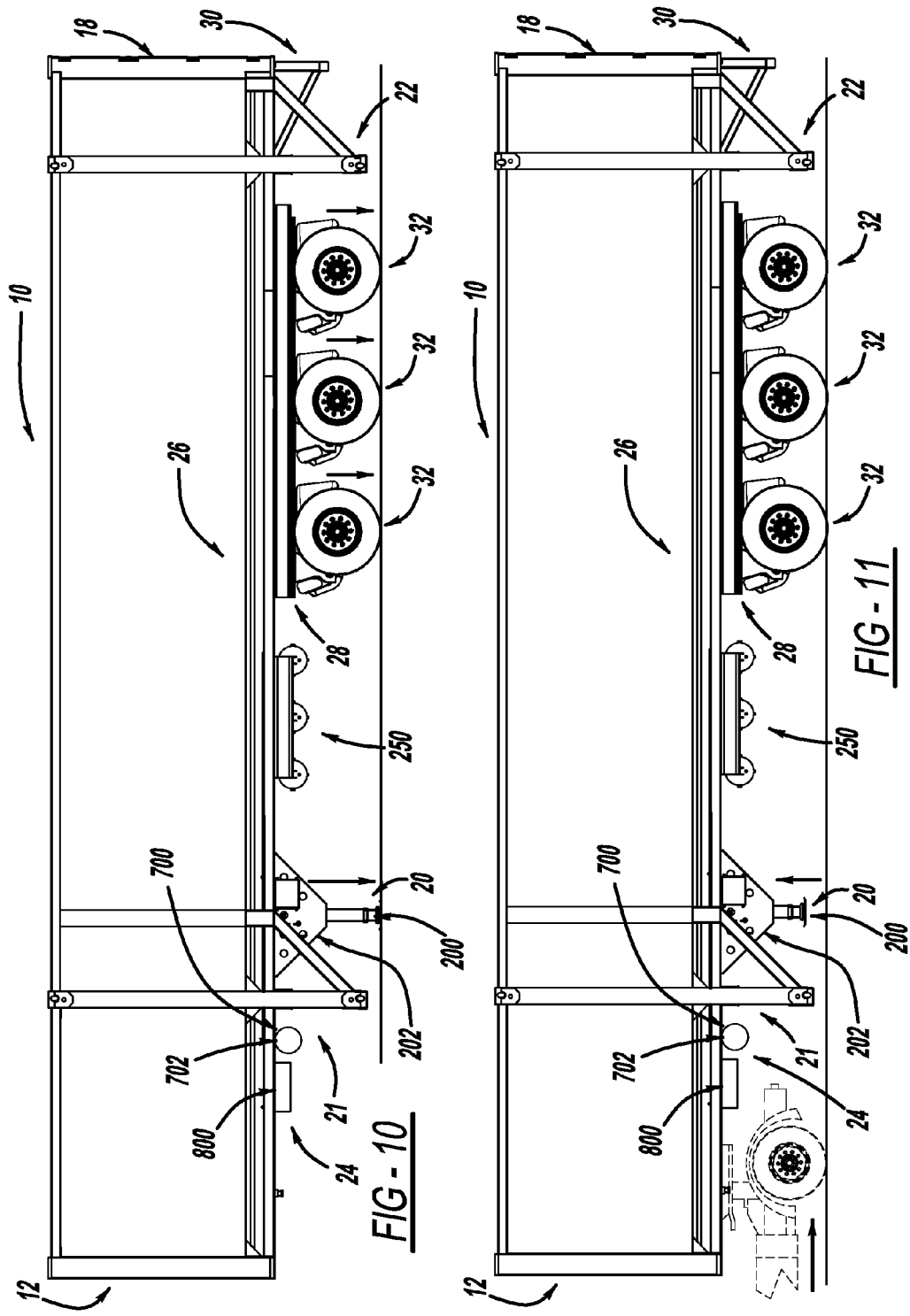

CARGO CONTAINER SYSTEM WITH SELECTIVELY DEPLOYABLE SUPPORT AND WHEEL ASSEMBLIES

CROSS-REFERENCE TO RELATED APPLICATION

The instant application claims priority to U.S. Provisional Patent Application Ser. No. 61/408,466 filed Oct. 29, 2010 and U.S. Provisional Patent Application Ser. No. 61/408,479 filed Oct. 29, 2010, and is a continuation-in-part of U.S. patent application Ser. No. 12/368,204 filed Feb. 9, 2009, pending, which claims priority to U.S. Provisional Patent Application Ser. No. 61/135,717 filed Jul. 23, 2008, the entire specifications of all of which are expressly incorporated herein by reference.

FIELD OF THE INVENTION

The present invention relates generally to cargo containers and, more specifically, to a cargo container system with selectively deployable support and/or wheel assemblies.

BACKGROUND OF THE INVENTION

The use of shipping containers has allowed the trans-shipment of large amounts of cargo from one seaport to another seaport. For example, large cargo ships are able to carry several dozen, or hundreds, and in some cases well over a thousand cargo containers, which are typically secured onto their decks or stored in their holds, from one port in one part of the world to a destination port on the other side of the globe. This shipping method has allowed cargo to be transported in a manner that would not be economically feasible or practicable by other conventional shipping methods, e.g., by air, rail or road.

When the cargo ship reaches its destination seaport, it is typically necessary to unload the cargo containers, whether they be loaded or empty, into holding areas because immediately placing the cargo containers onto the trailers/chassis of trucks (i.e., tractors) is a very time consuming and labor intensive process. Additionally, a great number of trailers/chassis must also be stored at the seaport to eventually be matched up with the great number of cargo containers. Because keeping dozens or hundreds of drivers and their tractors and/or trailers/chassis waiting in the confined space of a seaport loading dock is wasteful and impractical, many of the cargo containers have to be stored for a period of several days to several months until they can be matched up with an available driver and a tractor trailer/chassis. Thus, a typical busy seaport may have hundreds, and quite probably thousands, of cargo containers stacked in holding areas waiting for tractors and/or trailers/chassis to be brought into place wherein a crane (or other suitable device) can lift the cargo container and place it onto the trailer/chassis, whereupon the cargo container is secured to the trailer/chassis.

Accordingly, it would be advantageous to provide a new and improved cargo container system that overcomes at least one of the aforementioned problems.

SUMMARY OF THE INVENTION

In accordance with the general teachings of the present invention, a new and improved cargo container system is provided, wherein the cargo container system includes selectively deployable and retractable support and/or wheel assemblies. That is, the wheel assemblies are capable of being retracted upwardly while the support assembly is capable of being deployed upwardly and/or downwardly, e.g., during storage or shipment of the cargo container system (e.g., during sea travel or rail travel). At an appropriate time (e.g., the cargo container system is about to placed onto the ground or other surface by a crane or other suitable device), the wheel assemblies are then selectively deployed downwardly while the support assembly is capable of being retracted downwardly and/or upwardly, e.g., to provide a fully functional cargo container system/trailer combination that may be immediately capable of being engaged to a truck/tractor and driven away.

In accordance with a first embodiment of the present invention, a cargo container system is provided, comprising: (1) a cargo container; (2) a wheel assembly operably associated with a lower portion of the cargo container; and (3) a deployment system selectively operable to raise the wheel assembly towards the lower portion of the cargo container and lower the wheel assembly away from the lower portion of the cargo container In accordance with an aspect of this embodiment, an inflation/deflation system is operably associated with the deployment system.

In accordance with an aspect of this embodiment, the inflation/deflation system includes a fluid container system that is selectively operable to either inflate or deflate so as to cause the wheel assembly to move towards the lower portion of the cargo container or to move away from the lower portion of the cargo container.

In accordance with an aspect of this embodiment, the inflation/deflation system includes a second fluid container system that is selectively operable to either inflate or deflate so as to cause the wheel assembly to move towards the lower portion of the cargo container or to move away from the lower portion of the cargo container.

In accordance with an aspect of this embodiment, a control system is operably associated with the inflation/deflation system.

In accordance with an aspect of this embodiment, the control system is selectively operable to control the flow of a fluid either into or out of the first or second fluid container system.

In accordance with an aspect of this embodiment, the inflation/deflation system is pneumatically actuated or hydraulically actuated.

In accordance with an aspect of this embodiment, either the first or second fluid container system comprises an air bag system.

In accordance with an aspect of this embodiment, at least one support member is operably associated with the lower portion of the cargo container.

In accordance with an aspect of this embodiment, the support member is selectively operable to permit the cargo container to be placed atop another cargo container when the wheel assembly is raised towards the lower portion of the cargo container.

In accordance with an aspect of this embodiment, when the cargo container is placed atop the other cargo container, only the support member contacts the other cargo container and the wheel assembly does not contact the other cargo container.

In accordance with an aspect of this embodiment, the wheel assembly is selectively pivotable about an axis.

In accordance with an aspect of this embodiment, the wheel assembly is selectively operable to pivot arcuately downwardly away from the lower portion of the cargo container.

In accordance with an aspect of this embodiment, the wheel assembly is selectively operable to pivot arcuately upwardly towards the lower portion of the cargo container.

In accordance with a second embodiment of the present invention, a cargo container system is provided, comprising: (1) a cargo container; (2) a wheel assembly operably associated with a lower portion of the cargo container; (3) a deployment system selectively operable to raise the wheel assembly towards the lower portion of the cargo container and lower the wheel assembly away from the lower portion of the cargo container; and (4) an inflation/deflation system operably associated with the deployment system, wherein the inflation/deflation system includes a first fluid container system that is selectively operable to either inflate or deflate so as to cause the wheel assembly to move towards the lower portion of the cargo container and a second fluid container system that is selectively operable to either inflate or deflate so as to cause the wheel assembly to move away from the lower portion of the cargo container.

In accordance with an aspect of this embodiment, a control system is operably associated with the inflation/deflation system, wherein the control system is selectively operable to control the flow of a fluid either into or out of the first or second fluid container.

In accordance with an aspect of this embodiment, the inflation/deflation system is either pneumatically actuated or hydraulically actuated.

In accordance with an aspect of this embodiment, either the first or second fluid container system comprises an air bag system.

In accordance with a third embodiment of the present invention, a cargo container system is provided, comprising: (1) a cargo container; (2) a wheel assembly operably associated with a lower portion of the cargo container; (3) a deployment system selectively operable to raise the wheel assembly towards the lower portion of the cargo container and lower the wheel assembly away from the lower portion of the cargo container; (4) an inflation/deflation system operably associated with the deployment system, wherein the inflation/deflation system includes a first fluid container system that is selectively operable to either inflate or deflate so as to cause the wheel assembly to move towards the lower portion of the cargo container and a second fluid container system that is selectively operable to either inflate or deflate so as to cause the wheel assembly to move away from the lower portion of the cargo container; and (5) a control system operably associated with the inflation/deflation system, wherein the control system is selectively operable to control the flow of a fluid either into or out of the first or second fluid container, wherein the inflation/deflation system is either pneumatically actuated or hydraulically actuated, wherein either the first or second fluid container system comprises an air bag system.

Further areas of applicability of the present invention will become apparent from the detailed description provided hereinafter. It should be understood that the detailed description and specific examples, while indicating the preferred embodiment of the invention, are intended for purposed of illustration only and are not intended to limit the scope of the invention.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a schematic view of the cargo container system/trailer combination operably associated with a truck or tractor, with the cargo container system having its wheel assemblies in the deployed position and its support assembly in the retracted position, in accordance with a first embodiment of the present invention;

FIG. 2 is a partial schematic view of the cargo container system's wheel assemblies in the deployed position, in accordance with a second embodiment of the present invention;

FIG. 8 is a schematic view of the cargo container system's wheel assemblies in the retracted position, in accordance with an eighth embodiment of the present invention;

FIG. 9 is a schematic view of the cargo container system's landing gear assembly in the deployed position, in accordance with a ninth embodiment of the present invention;

FIG. 10 is a schematic view of the cargo container system's landing gear assembly in the deployed position while the wheel assemblies are assuming the deployed position, in accordance with a tenth embodiment of the present invention; and FIG. 11 is a schematic view of the cargo container system's wheel assemblies in the deployed position while the landing gear assembly is assuming the retracted position, in accordance with an eleventh embodiment of the present.

The same reference numerals refer to the same parts throughout the various Figures.

DETAILED DESCRIPTION OF THE INVENTION

Figure 3:
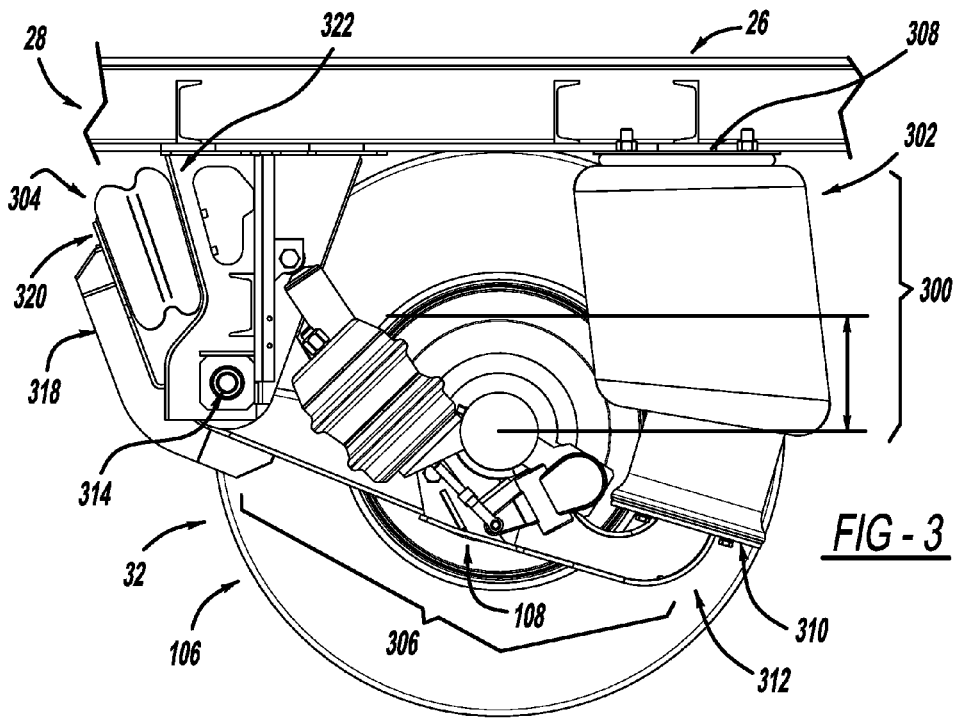
FIG. 3 is a partial schematic view of one of the cargo container system's wheel assemblies in the deployed position, in accordance with a third embodiment of the present invention.

The following description of the preferred embodiment(s) is merely exemplary in nature and is in no way intended to limit the invention, or uses.

Referring to the Figures generally, a new and improved cargo container system is generally shown at 10. Although the cargo container system 10 is shown as being similar to a conventional trailer, it should be appreciated that the cargo container system 10 may be configured in any number of different shapes and designs. By way of a non-limiting example, the cargo container system 10 may be configured as a temperature controlled trailer or container (e.g., a "reefer") that may include insulated walls, ceiling and floor. By way of another non-limiting example, the cargo container system 10 may be configured as a bulk commodities container (e.g., having holes in the ceiling to load commodities and possibly doors on the bottom to unload bulk commodities). By way of still another non-limiting example, the cargo container system 10 may also contain ramps inside the interior space that may either move up or down or be fixed in place, so as to be able to haul vehicles therein.

Referring specifically to FIGS. 1, 2, 4 and 6, the cargo container system 10 may primarily include a front wall portion 12, two spaced and opposed side wall portions 14, 16, respectively, and a rear door system 18. A selectively operable landing gear assembly 20, which may act as a variable height support assembly, may be located near the front portion of the cargo container system 10. A pair of fixed support assemblies 21, 22, respectively, may be provided near a bottom surface 24 of the cargo container system 10. Contained within the interior of the cargo container system 10 may be a floor or deck portion 26. An undercarriage system 28 may be operably associated with the bottom surface 24 of the cargo container system 10. An optional rear support 30 may also be provided near the rear portion of the cargo container system 10. One or more wheel assemblies 32 may be operably associated with the undercarriage system 28. Although three wheel assemblies are shown, it should be appreciated that either less than or more than three wheel assemblies may be used in the practice of the present invention. Referring specifically to FIG. 1, the cargo container system 10 is shown as being engaged to a truck/tractor 34 (e.g., via a king-pin 36 (e.g., formed on the bottom surface 24 of the cargo container system 10)) that may conventionally engage a fifth wheel assembly 38 formed on the truck/tractor 34).

Referring specifically to FIGS. 3 and 5-11, one feature of the present invention is that the cargo container system 10 may include a selectively deployable/retractable wheel assembly 32. Another feature of the present invention is that the cargo container system 10 may include a selectively deployable/retractable landing gear assembly 20. That is, while the retraction of the wheel assembly 32 upwardly allows the stacking feature of the cargo container system 10, the ability of the landing gear assembly 20 and/or wheel assembly 32 to be selectively deployed and/or retracted, as the case may be, enables the cargo container system 10 to function as a combination container/trailer system. That is, these features of the present invention obviate the need for a separate trailer system to be used, as the cargo container system 10 may function as both a cargo storage system and, simultaneously, as a trailer system. In this aspect, the present invention may provide for the landing gear assembly 20 and/or the wheel assembly 32 to be capable of being selectively deployed and/or retracted, e.g., during storage or shipment of the cargo container system 10 (e.g., during sea travel, rail travel and/or the like). At an appropriate time (e.g., when the cargo container system 10 is about to placed onto the ground or other surface by a crane or other suitable device), the landing gear assembly 20 and/or the wheel assembly 32 may then be selectively deployed downwardly (in the case of the wheel assembly 32) and/or deployed and/or retracted (in the case of the landing gear assembly 20) so as to provide a fully functional cargo container system/trailer combination that may be immediately capable of being engaged to the truck/tractor 34 (see FIGS. 1 and 11) and immediately driven away. Thus, the previously described, time-consuming, and laborious process of mounting and securing shipping containers onto the trailers of trucks/tractors has been eliminated by the present invention.

Referring specifically to FIGS. 8 and 9, the cargo container system 10, e.g., when the landing gear assembly 20 is deployed and/or retracted and/or the wheel assembly 32 is retracted, may be placed on any generally flat surface, such as but not limited to a transportation system 40, such as, but not limited to, a ship, intermodal rail container, flat bed truck, another cargo container system, the ground, and/or the like. In this manner, the cargo container system 10 may be handled and shipped in a like manner to that of conventional ocean containers, rail box cars, semi-trailers, and/or the like. By way of a non-limiting example, the fixed support assemblies 21, 22, respectively, may be the contact points against the flat surface. That is, the weight of the cargo container system 10 may be borne by the fixed support assemblies 21, 22, respectively, as opposed to the weight of the cargo container system 10 being borne by the undercarriage system 28. In this manner, potential damage to cargo container systems at the bottom of a stack of cargo container systems may be avoided.

In accordance with one aspect of the present invention, an optional, and highly simplified, chassis 42 may be incorporated into the bottom surface 24 of the cargo container system 10, e.g., in proximity to the undercarriage system 28. Thus, the chassis 42 may provide a support structure for attachment of the landing gear assembly 20 and/or wheel assembly 32 thereto. However, it should be understood that rather than using a chassis, the bottom surface 24 of the cargo container system 10 may be manufactured with strong and rigid materials (e.g., steel cross beams or supports) that could obviate the need for a chassis. However, although the chassis 42 may be optional, its presence may add increased structural support and rigidity to the bottom surface 24 of the cargo container system 10, without the need to reinforce the bottom surface 24 of the cargo container system 10.

Referring to FIGS. 3-7, each wheel assembly 32 may include two spaced and opposed wheel units 100, 102, respectively, operably interconnected by an axle member 104. Each of the wheel units 100, 102, respectively, may include a tire member 106 mounted to a wheel hub 108. Other systems such as suspension systems (e.g., shock absorbers), brake systems, electronic sensors, may be provided in connection with each of the wheel units 100, 102, respectively.

Referring to FIGS. 8 and 9, the landing gear assembly 20 may include a foot portion 200 telescopically received within a housing portion 202 such that the foot portion 200 may selectively move up and down relative to the housing portion 202.

In accordance with another aspect of the present invention, a deployment system 250 may cooperate with the landing gear assembly 20 and/or the wheel assembly 32 in a manner that may allow the deployment system 250 to raise and/lower the landing gear assembly 20 and/or the wheel assembly 32 and then, when desired, lower and/or raise the landing gear assembly 20 and/or the wheel assembly 34. It should be noted that the deployment system 250 may function in a manner that it may raise and/or lower the landing gear assembly 20 and/or the wheel assembly 32 simultaneously and/or sequentially. Additionally, it should be appreciated that the landing gear assembly 20 and the wheel assembly 32 may be caused to move in the same direction at the same time or in opposite directions at the same time, as circumstances warrant.

Figure 5:
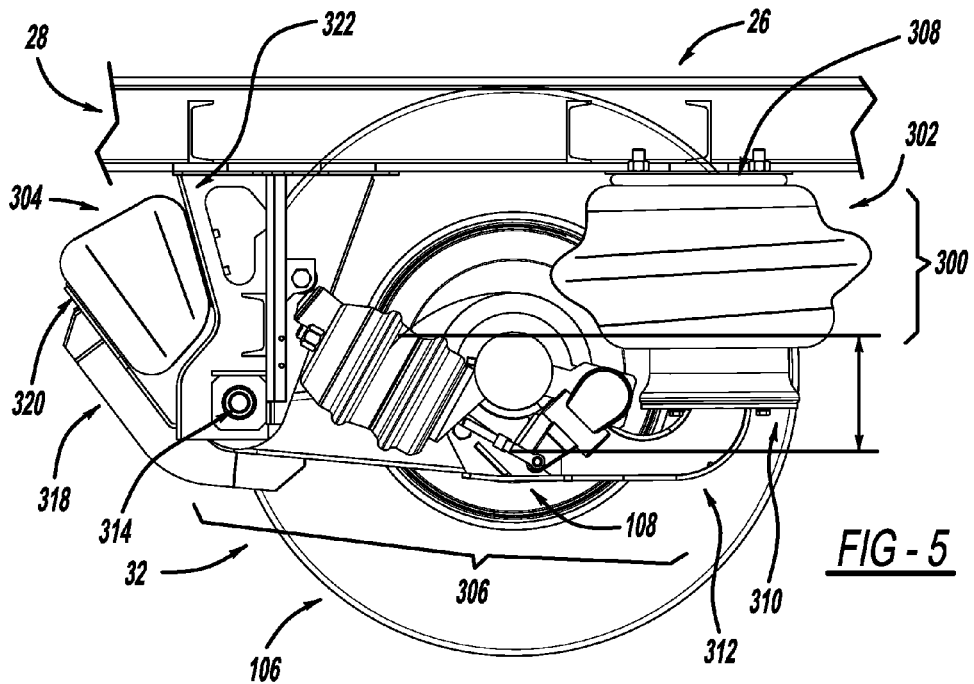
FIG. 5 is a partial schematic view of one of the cargo container system's wheel assemblies in the retracted position, in accordance with a fifth embodiment of the present invention.
Figure 4:
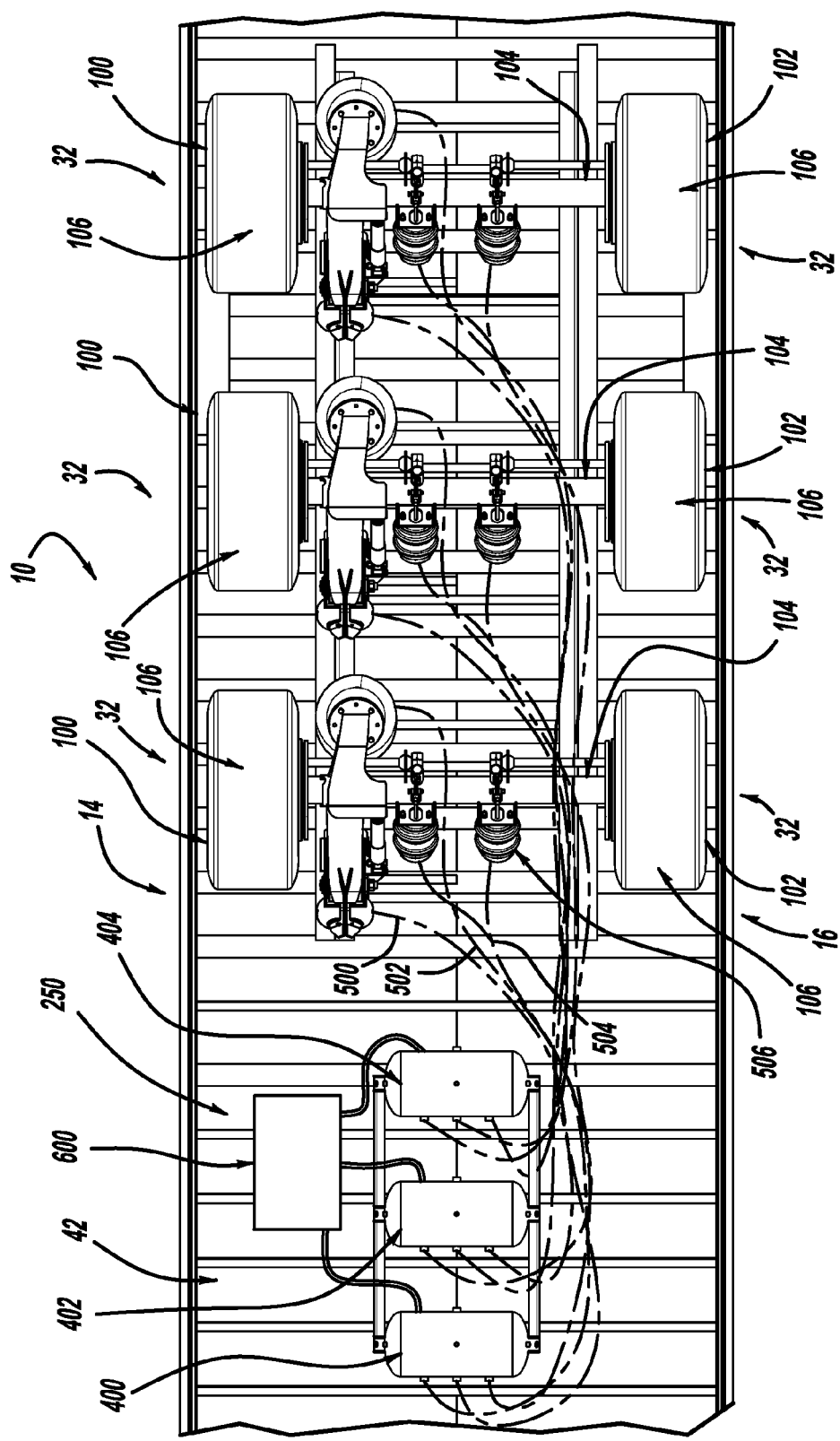
FIG. 4 is a partial schematic view of the cargo container system's wheel assembly deployment system, in accordance with a fourth embodiment of the present invention.
Figure 6:
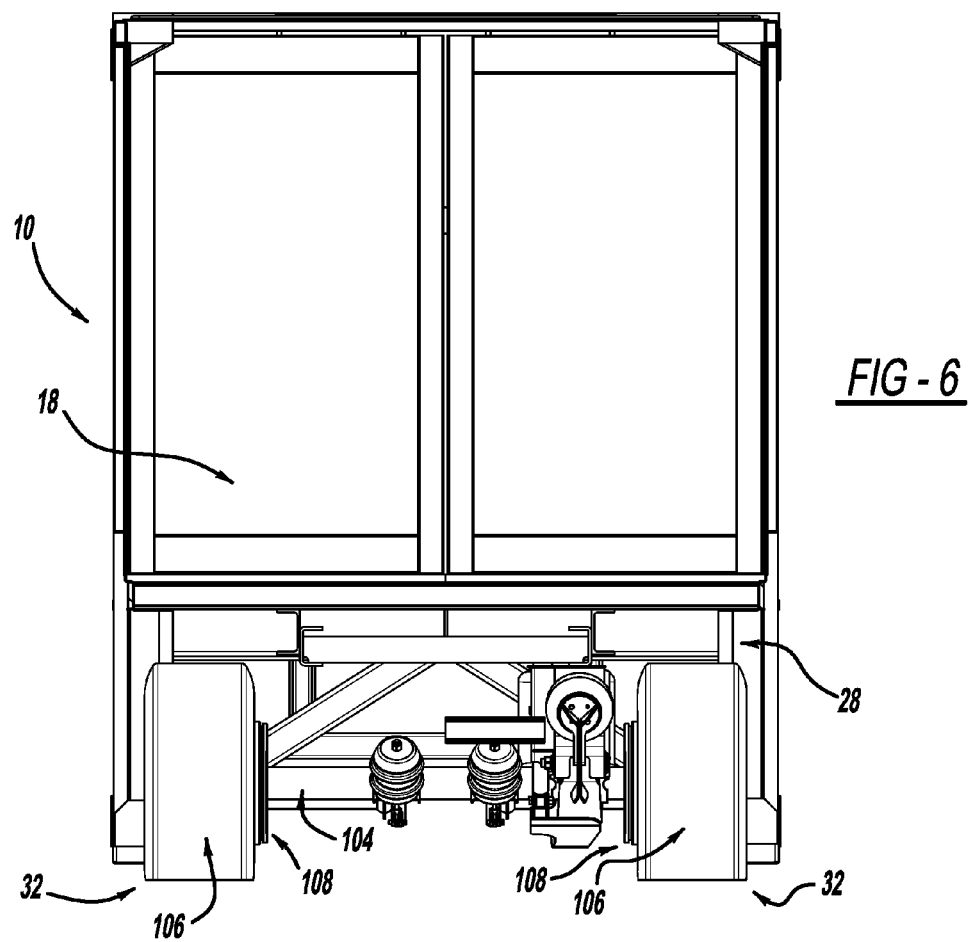
FIG. 6 is an end view of one of the cargo container system's wheel assemblies in the retracted position, in accordance with a sixth embodiment of the present invention.
Figure 7:
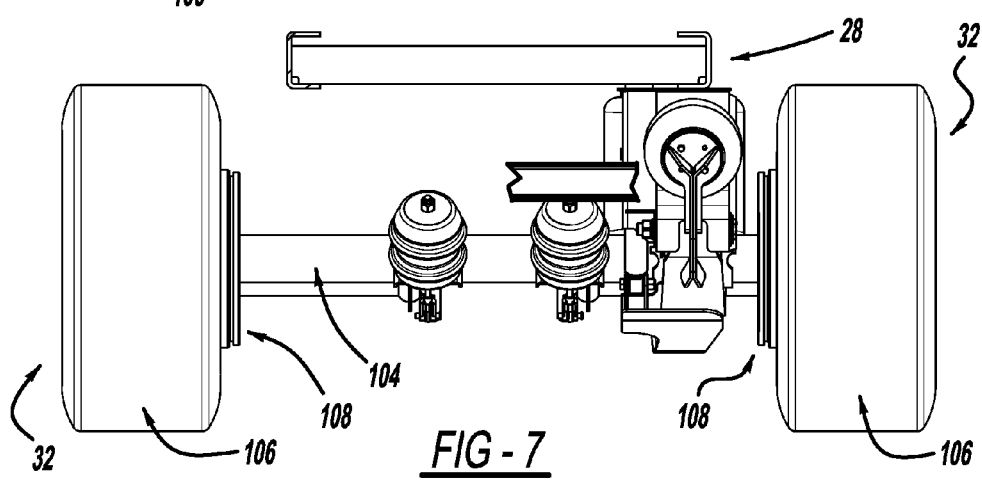
FIG. 7 is a partial end view of one of the cargo container system's wheel assemblies in the retracted position, in accordance with a seventh embodiment of the present invention.

Referring specifically to FIGS. 3-5, the deployment system 250 includes a wheel deployment system 300 that includes at least a pair of air bag members 302, 304, respectively, that may be selectively operable to cause a linkage system 306 to raise and/or lower the wheel assembly 32. It should be appreciated that several air bag members may be associated with each wheel assembly 32, including, but not limited to multiple air bag members to either raise and/or lower the wheel assembly 32. Air bag member 302 may be operably associated with a plate member 308 mounted to a portion of the undercarriage system 28. Air bag member 302 may be selectively operable to urge against a plate member 310 associated with a first linkage member 312. First linkage member 312 may be pivotally associated with a pivot point 314 pivotally associated with a mounting bracket 316 mounted to another portion of the undercarriage system 28. A second linkage member 318 may also be pivotally associated with the pivot point 314 and the first linkage member 312. Air bag member 304 may be operably associated with the second linkage member 318 as well as plate member 320 mounted to a portion of the second linkage member 318 and a plate member 322 mounted to a portion of the mounting bracket 316.

When the wheel assembly 32 is desired to be in the deployed or "lowered" position, as shown in FIG. 3, it is necessary to substantially fully inflate air bag member 302 and simultaneously substantially fully deflate air bag member 304 such that air bag member 302 presses downwardly and urges against plate member 310 such that the first linkage member 312 overcomes any force exerted by air bag member 304 against plate member 308. In this view, the second linkage member 318 has been moved upwardly and inwardly (e.g., in an arcuate or linear fashion) toward the mounting bracket 316, thus causing simultaneous movement of the wheel assembly 32, e.g., in an arcuate or linear fashion, so as to move the wheel assembly 32 away from the cargo container system 10.

When the wheel assembly 32 is desired to be in the retracted or "stowed" position, as shown in FIG. 4, it is necessary to substantially fully inflate air bag member 304 and simultaneously substantially fully deflate air bag member 302 such that air bag member 304 presses upwardly and urges against plate member 322 such that the second linkage member 318 overcomes any force exerted by air bag member 302 against plate member 322. In this view, the second linkage member 318 has been moved downwardly and outwardly (e.g., in an arcuate or linear fashion) away from the mounting bracket 316, thus causing simultaneous movement of the wheel assembly 32, e.g., in an arcuate or linear fashion, so as to move the wheel assembly 32 towards the cargo container system 10.

Referring specifically to FIG. 4, in order to effectuate the inflation and/or deflation of the air bag members 302, 304, respectively, at least one and preferably a plurality of compressed air (or other fluid, such as but not limited to liquids and/or gases) canisters 400, 402, 404, respectively, may be provided. Although three canisters are shown, it should be appreciated that either less than or more than this number of canisters may be employed. In this view, there are three pairs of wheel assemblies 32; accordingly, three canisters are shown for illustrative purposes only. It should be appreciated that each wheel assembly on either side of the cargo container system 10 may be provided with the previously described deployment system; however, in FIG. 4, the deployment systems for the wheel assemblies located on the right side of the cargo container system 10 have been omitted for purposes of clarity.

By way of a non-limiting example, each canister may be provided with pneumatic lines 500, 502, 504, respectively, that may selectively provide compressed air, when appropriate, to the air bag members 302, 304, respectively, as well as the brake system 506 of each axle member 104. When it is desired to deflate one of the air bag members 302, 304, respectively, (or release the brakes) the canisters may receive the compressed air therefrom. In order to monitor and control the operational parameters (e.g., pressure, flow, leak detection, and/or the like), a control system 600 may be operably associated with the canisters 400, 402, 404, respectively. It should be noted that when the cargo container system 10 is engaged to the truck/tractor 34, the canisters 400, 402, 404, respectively, may be constantly or periodically recharged (e.g., through the truck's pneumatic systems) to prevent any loss of air pressure within air bag member 302 to prevent unintended deflation thereof. Additionally, when the cargo container system 10 is engaged to the truck/tractor 34, monitoring and control of the operational parameters (e.g., pressure, flow, leak detection, and/or the like) of the canisters 400, 402, 404, respectively, may be done through the truck's control systems, as opposed to, or in conjunction with, control system 600.

Referring specifically to FIGS. 8-11, the deployment system 250 may also include a landing gear assembly deployment system 700 that may include a compressed air (or other gas) canister 702 that may be selectively operable (e.g., via a pneumatic line that is associated with a pneumatically powered motor) to cause the foot portion 200 to extend outwardly from the housing portion 202. Alternatively, one, or more, of canisters 400, 402, 404, respectively, may be used to supply compressed air to the landing gear assembly deployment system 700, and/or receive compressed air therefrom.

When the landing gear assembly 20 is desired to be in the deployed or "lowered" position, as shown in FIGS. 9 and 10, it may be necessary to cause the foot portion 200 to extend outwardly from the housing portion 202.

When the landing gear assembly 20 is desired to be in the retracted or "stowed" position, as shown in FIGS. 8 and 11, it may be necessary to permit the foot portion 200 to retract inwardly up into the housing portion 202.

In order to monitor and control the operational parameters (e.g., pressure, flow, leak detection, and/or the like), a control system 800 may be operably associated with canister 702. It should be noted that when the cargo container system 10 is engaged to the truck/tractor 34, the canister 702 may be constantly or periodically recharged (e.g., through the truck's pneumatic systems) to prevent any loss of air pressure within the landing gear assembly 20 to prevent unintended deflation thereof. Additionally, when the cargo container system 10 is engaged to the truck/tractor 34, monitoring and control of the operational parameters (e.g., pressure, flow, leak detection, and/or the like) of the canister 702 may be done through the truck's control systems, as opposed to, or in conjunction with, control system 800. Alternatively, control system 600 may be used to monitor and control canister 702.

It should also be appreciated that rather than using compressed air, i.e., a pneumatic system, the present invention can alternatively be practiced with hydraulic fluid, i.e., a hydraulic system, to actuate the deployment system, as previously described. By way of a non-limiting example, hydraulic fluid can be selectively introduced into one fluid container and/or removed from a second fluid container so as to deploy a wheel assembly, i.e., cause the wheel assembly to move downwardly (e.g., in an arcuate or linear fashion) away from the undersurface of the cargo container system. By way of another non-limiting example, hydraulic fluid can be selectively introduced into one fluid container and/or removed from a second fluid container so as to stow a wheel assembly, i.e., cause the wheel assembly to move upwardly (e.g., in an arcuate or linear fashion) towards the undersurface of the cargo container system.

Other well known elements of cargo containers, such as, but not limited to, brake lights, signal lights, doors, door handles, door locks, and/or the like, which are conventional in nature, will not be described herein but may be used in conjunction with the cargo container system of the present invention.

While the invention has been described with reference to an exemplary embodiment, it will be understood by those skilled in the art that various changes can be made and equivalents can be substituted for elements thereof without departing from the scope of the invention. In addition, many modifications can be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A cargo container system, comprising:
   a cargo container;
   a wheel assembly operably associated with a lower portion of the cargo container;
   a deployment system selectively operable to raise the wheel assembly towards the lower portion of the cargo container and lower the wheel assembly away from the lower portion of the cargo container;
   wherein when the wheel assembly is raised towards the lower portion of the cargo container, the wheel assembly is not operable to contact a ground surface; and
   first and second fixed support members extending downwardly away from the lower portion of the cargo container;
   wherein the fixed support members are selectively operable to permit the cargo container to be placed atop another cargo container when the wheel assembly is raised towards the lower portion of the cargo container;
   wherein when the cargo container is placed atop the other cargo container, only the fixed support members contact the other cargo container and the wheel assembly does not contact the other cargo container.

2. The invention according to claim 1, further comprising an inflation/deflation system operably associated with the deployment system.

3. The invention according to claim 2, wherein the inflation/deflation system includes a fluid container system that is selectively operable to either inflate or deflate so as to cause the wheel assembly to move towards the lower portion of the cargo container or to move away from the lower portion of the cargo container.

4. The invention according to claim 3, wherein the inflation/deflation system includes a second fluid container system that is selectively operable to either inflate or deflate so as to cause the wheel assembly to move towards the lower portion of the cargo container or to move away from the lower portion of the cargo container.

5. The invention according to claim 2, wherein the inflation/deflation system includes a first fluid container system that is selectively operable to either inflate or deflate so as to cause the wheel assembly to move towards the lower portion of the cargo container and a second fluid container system that is selectively operable to either inflate or deflate so as to cause the wheel assembly to move away from the lower portion of the cargo container.

6. The invention according to claim 2, further comprising a control system operably associated with the inflation/deflation system.

7. The invention according to claim 6, wherein the control system is selectively operable to control the flow of a fluid either into or out of a first fluid container system that is selectively operable to either inflate or deflate so as to cause the wheel assembly to move towards the lower portion of the cargo container and a second fluid container system that is selectively operable to either inflate or deflate so as to cause the wheel assembly to move away from the lower portion of the cargo container.

8. The invention according to claim 2, wherein the inflation/deflation system is either pneumatically actuated or hydraulically actuated.

9. The invention according to claim 5, wherein either the first or second fluid container system comprises an air bag system.

10. The invention according to claim 1, wherein the wheel assembly is selectively pivotable about an axis.

11. The invention according to claim 1, wherein the wheel assembly is selectively operable to pivot arcuately downwardly away from the lower portion of the cargo container.

12. The invention according to claim 1, wherein the wheel assembly is selectively operable to pivot arcuately upwardly towards the lower portion of the cargo container.

13. A cargo container system, comprising:
   a cargo container;
   a wheel assembly operably associated with a lower portion of the cargo container;
   a deployment system selectively operable to raise the wheel assembly towards the lower portion of the cargo container and lower the wheel assembly away from the lower portion of the cargo container;
   wherein when the wheel assembly is raised towards the lower portion of the cargo container, the wheel assembly is not operable to contact a ground surface;
   first and second fixed support members extending downwardly away from the lower portion of the cargo container;
   wherein the fixed support members are selectively operable to permit the cargo container to be placed atop another cargo container when the wheel assembly is raised towards the lower portion of the cargo container;
   wherein when the cargo container is placed atop the other cargo container, only the fixed support members contact the other cargo container and the wheel assembly does not contact the other cargo container; and
   an inflation/deflation system operably associated with the deployment system;
   wherein the inflation/deflation system includes a first fluid container system that is selectively operable to either inflate or deflate so as to cause the wheel assembly to move towards the lower portion of the cargo container and a second fluid container system that is selectively operable to either inflate or deflate so as to cause the wheel assembly to move away from the lower portion of the cargo container.

14. The invention according to claim 13, further comprising a control system operably associated with the inflation/deflation system, wherein the control system is selectively operable to control the flow of a fluid either into or out of the first or second fluid container.

15. The invention according to claim 13, wherein the inflation/deflation system is either pneumatically actuated or hydraulically actuated.

16. The invention according to claim 13, wherein either the first or second fluid container system comprises an air bag system.

17. A cargo container system, comprising:
   a cargo container;
   a wheel assembly operably associated with a lower portion of the cargo container;
   a deployment system selectively operable to raise the wheel assembly towards the lower portion of the cargo container and lower the wheel assembly away from the lower portion of the cargo container;
   wherein when the wheel assembly is raised towards the lower portion of the cargo container, the wheel assembly is not operable to contact a ground surface;

first and second fixed support members extending downwardly away from the lower portion of the cargo container;

wherein the fixed support members are selectively operable to permit the cargo container to be placed atop another cargo container when the wheel assembly is raised towards the lower portion of the cargo container; and wherein when the cargo container is placed atop the other cargo container, only the fixed support members contact the other cargo container and the wheel assembly does not contact the other cargo container;

an inflation/deflation system operably associated with the deployment system;

wherein the inflation/deflation system includes a first fluid container system that is selectively operable to either inflate or deflate so as to cause the wheel assembly to move towards the lower portion of the cargo container and a second fluid container system that is selectively operable to either inflate or deflate so as to cause the wheel assembly to move away from the lower portion of the cargo container; and a control system operably associated with the inflation/deflation system, wherein the control system is selectively operable to control the flow of a fluid either into or out of the first or second fluid container;

wherein the inflation/deflation system is either pneumatically actuated or hydraulically actuated;

wherein either the first or second fluid container system comprises an air bag system.

* * * * *